Figure 1:
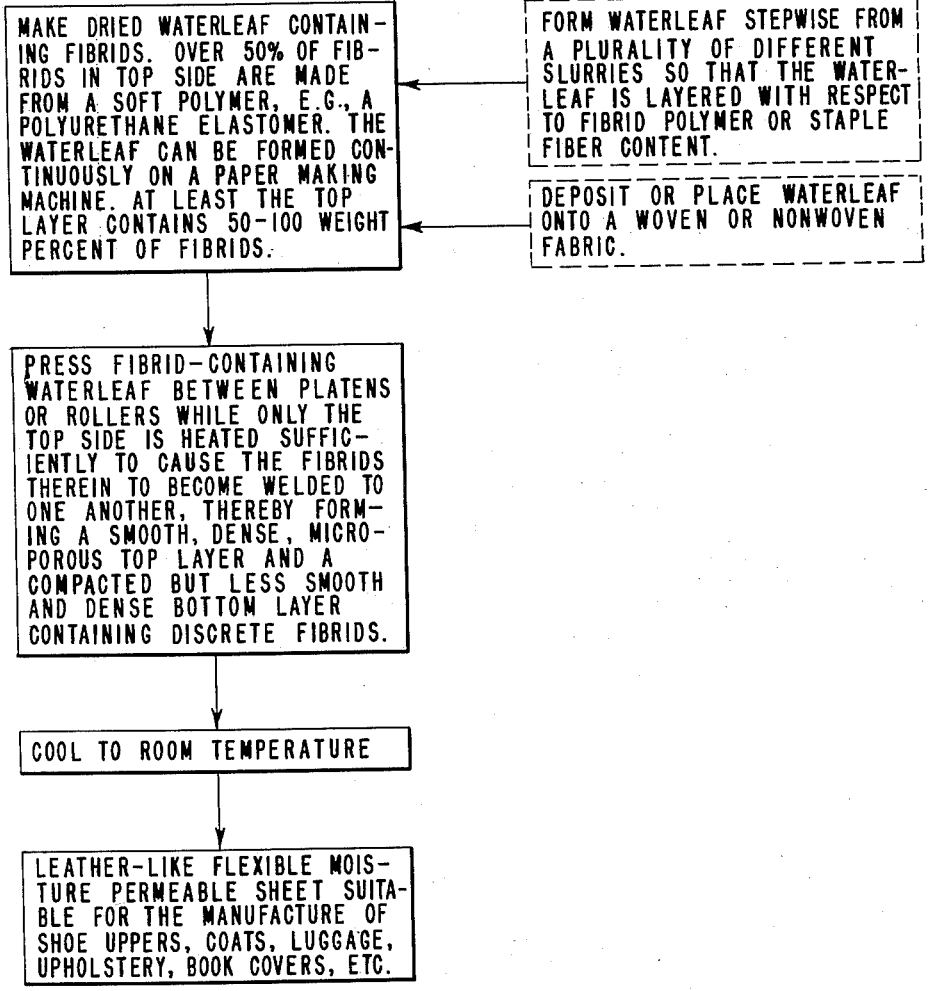

Aug. 13, 1963  R. W. BUNDY  3,100,733
POLYMERIC SHEET MATERIAL AND METHOD OF MAKING SAME
Filed Jan. 19, 1959

INVENTOR
ROBERT W. BUNDY

BY Melville J. Hayes

AGENT

United States Patent Office 3,100,733
Patented Aug. 13, 1963

3,100,733
POLYMERIC SHEET MATERIAL AND METHOD OF MAKING SAME
Robert Wendel Bundy, Wilmington, Del., assignor to E. I. du Pont de Nemours and Company, Wilmington, Del., a corporation of Delaware
Filed Jan. 19, 1959, Ser. No. 787,537
10 Claims. (Cl. 162—108)

This invention relates to novel polymeric sheet materials, and more particularly to such sheet materials which are substantially more smooth and dense on one side than on the other side and to a method of making same. Preferred embodiments of this invention are concerned with the production of flexible leather-like sheet materials, some of which are suitable for use as shoe upper materials, and all of which are useful as replacements for genuine leather.

There are many important uses in commerce and industry for sheet materials which are substantially more smooth and dense on one side than on the other side. The utility of such materials stems from the fact that many applications require one side of the sheet to be glossy, abrasion resistant, and/or impervious or at least repellent to water or other liquids, while requiring the other side of the sheet to be relatively rough, dull, resilient, porous and/or absorbent. Floor coverings, leather substitutes, wall coverings, tank linings, upholstery materials, book cover materials, and polymer-coated fabrics and fibrous webs in general exemplify well-known products requiring such a contrast in surface properties. Current methods of making such products include the well-known processes of impregnating, coating and/or laminating woven fabrics, non-woven fabrics and waterleaves of natural or synthetic fibers with various polymer compositions.

While the known methods of making these materials have been quite satisfactory in general, they have not been without limitations. And there are still many products in this broad class which cannot be produced economically or effectively by known methods. It has often been necessary to employ costly materials and cumbersome methods to achieve the requisite balance of surface properties, or sufficient adhesion between layers to prevent delamination of the structure in service. Man-made shoe uppers and other leather-replacement materials have been especially difficult to produce effectively by known methods. Moreover, as far as is known, a method has not heretofore been provided which is capable of turning out a satisfactory man-made shoe-upper material at a price competitive with that of natural leather. It is well known that leather has an almost inimitable balance of desirable properties for shoe uppers and other apparel items. Because of its chemical and physical structure, the "skin" or outer side of leather is smooth, easily polished, moisture permeable ("breathable") yet relatively water repellent, and resistant to abrasion and scuffing. On the other hand, the "flesh" or inner side is more absorbent and resilient and less smooth and dense, all of which contributes to wearing comfort. Attempts to simulate the structure and properties of leather have never been entirely successful.

The primary object of this invention is to provide new and useful polymeric sheet materials which are substantially more smooth and dense on one side than on the other side. Another object is to provide a novel method of making such sheet materials.

A more specific object is the provision of a flexible moisture-permeable sheet material having properties closely resembling those of leather, especially with respect to appearance, durability and wearing comfort. It is also an object to provide a method of making these leather-like materials which is adapted for economical mass production techniques.

Other important objects will be readily apparent from the following description of the invention.

The present invention resides primarily in the discovery that new and useful polymeric sheets result from the general method which comprises pressing a waterleaf comprising fibrids while one side of the waterleaf is at an elevated temperature, thereby welding the fibrids in the heated side to one another and making said side relatively smooth and dense; and meanwhile maintaining the other side of the waterleaf at a low enough temperature so that the fibrids therein do not become welded to one another. Thereafter, the heated side is cooled, either with or without pressure. The side of the product which was hot during the pressing operation is substantially more smooth and dense than the other side. Under the influence of heat, the fibrids become more or less tacky, and with the aid of pressure they become stuck together; thus on being cooled, they are inseparably bonded or "welded" to one another.

It has further been discovered that when a major proportion (i.e., over 50% by weight) of the waterleaf fibrids are fibrids of a soft polymer, and the pressing conditions are suitably controlled, a flexible moisture-permeable product is obtained.

Herein, the term "soft polymer" signifies a polymer having an initial modulus below 0.9 gram per denier.

The term "waterleaf" is intended to designate a paper-like structure of intimately entangled fibrous particles obtained by depositing the particles from a slurry (aqueous suspension) onto a porous membrane such as a screen or felt in the same general manner as paper is made, e.g., in a papermaker's box (sheet mold) or on a Fourdrinier machine.

By the term "fibrids" is meant non-rigid, wholly synthetic polymeric particles capable of forming paper-like structures when deposited from a slurry onto the membrane of a papermaking apparatus.

Fibrids have at least one dimension of minor magnitude relative to their largest dimension; i.e., they are fiber-like or film-like. They are small enough so that not over 10% are retained on a 10-mesh screen, yet large enough so that at least 90% are retained on a 200-mesh screen when deposited from a slurry. Fibrids are described more fully in abandoned U.S. application S.N. 635,876, filed January 23, 1957, and assigned to the assignee of the present application.

The preparation of fibrids from a variety of synthetic polymers is described in detail in abandoned U.S. application S.N. 635,721 filed January 23, 1957, and assigned to the assignee of the present application. As is known, polymers can be slightly modified before being converted into fibrids, e.g., they may be dyed, pigmented and/or plasticized.

Figure 2:
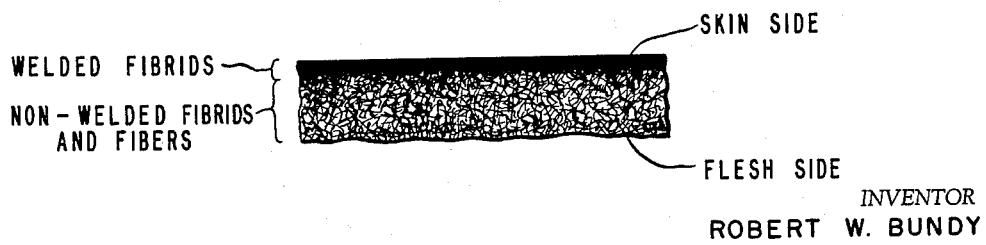

FIGURE 1 is a flow diagram indicating the principal steps in the process of this invention. A preferred leather replacement embodiment of this invention is illustrated in FIGURE 2 of the accompanying drawing which shows an enlarged fragmentary cross-sectional view of the product. (See Example 9 for a detailed description of such a product, and its preparation.)

The invention will be further illustrated but not limited by the following examples, in which the quantities given are on a weight basis unless otherwise indicated.

*Example 1*

A quantity of polyurea elastomer fibrids is produced from a soft polymer prepared as follows: 124.5 parts of poly(tetramethylene oxide) glycol of about 1000 molecular weight and 10.50 parts of 4-methyl-m-phenylene diisocyanate are condensed with stirring in an anhydrous atmosphere for 3 hours at steam bath temperature. Then 30.0 parts of methylene bis(4-phenyl isocyanate) dissolved in dry methylene chloride is added to the resultant hydroxyl-terminated intermediate, and the mixture is stirred for 1 hour on a steam bath. An isocyanate-terminated derivative is thereby obtained. After cooling, this derivative is dissolved in 400 parts of N,N-dimethylformamide (abbreviated as DMF). To this solution is added 3.0 parts of hydrazine hydrate dissolved in 26 parts of DMF. The resulting polymer solution, containing about 28% solids, is diluted with DMF to an elastomer concentration of 7.3%.

The polyurea elastomer fibrids are produced by pouring one part of the 7.3% elastomer solution as a fine stream into 4 parts of glycerol while the latter is agitated in a commercial one-quart Waring Blendor running at top speed. The polyurea fibrids in the resulting slurry are deposited on a 100-mesh screen in a paper sheet mold, washed with water, and thereafter re-dispersed in water. As a result, the original liquids in the fibrid slurry are replaced with water.

A quantity of nylon (polyhexamethylene adipamide) fibrids is prepared from a 10% solution of nylon in 90% formic acid by gradually pouring 10 parts of the nylon solution as a fine stream into 100 parts of a 50/50 mixture of glycerol and water at 60° F. while the latter is vigorously agitated (e.g., in a Waring Blendor). The resulting nylon fibrids are screened, washed and slurried in water in the manner employed above with the polyurea fibrids.

A flexible polymeric sheet material resembling leather is made by first depositing 3 waterleaf layers in a standard 8″ x 8″ paper-making sheet mold. The first waterleaf layer consists of 2 grams of nylon fibrids, deposited from the above prepared aqueous slurry. The second layer consists of 2 grams of nylon fibrids and 2 grams of polyurea elastomer fibrids, deposited from a 50/50 mixture of the two above-prepared aqueous fibrid slurries. Prior to depositing the second layer, the first waterleaf layer is secured in the bottom of the sheet mold by superposing thereon a coarse screen (½ inch between wires) and a wood block. As the slurry for the second layer is poured into the sheet mold, the wood block eventually floats to the top, leaving the first layer undisturbed. Just before vacuum draining the system for deposition of the second layer, the wood block and coarse screen are removed without materially disturbing the first layer. The third waterleaf layer, consisting of 5 grams of polyurea fibrids, is deposited from the above-prepared polyurea fibrid slurry by the same technique used in forming the second layer.

Next, the vacuum-drained 3-layer composite waterleaf is removed from the sheet mold and oven dried at 120° C. The dried waterleaf is then pressed in a standard laboratory press, one platen of which is heated to 190° C. and the other platen of which is at room temperature. The hot platen is contiguous with the first layer (nylon fibrids) of the waterleaf, and the cold platen is contiguous with the third layer. The pressing operation consists of subjecting the waterleaf to a pressure of 1000 p.s.i. for 30 seconds while heated on one side and positioned as just described.

When cooled and removed from the press, the pressed waterleaf is found to be a tough flexible sheet material which is useful in many commercial applications where leather is normally used, for example in slippers, upholstery, handbags and luggage. Because of the welding together of the nylon fibrids in the side that was heated during pressing, this side of the product is very smooth, dense and abrasion resistant, resembling the skin or outer side of finished leather. And because the intimately entangled polyurea fibrids in the opposite side of the sheet are still discrete and not welded together, this side of the product is relatively resilient, absorbent and porous, resembling the flesh or rough inner side of finished leather. Due to the intimate entanglement of the fibrids throughout the structure of the pressed waterleaf, the layers are inseparably bound together.

*Example 2*

A two-layer waterleaf is made by depositing in an 8″ x 8″ sheet mold a first layer consisting of 5 grams of the polyurea fibrids of Example 1, and a second layer consisting of 15 grams of the same polyurea fibrids and 5 grams of ¼″ 1.5 d.p.f. nylon fibers. It will be understood that the slurry used for the second layer is prepared by dispersing sufficient nylon fibers in a portion of the polyurea fibrid slurry of Example 1 to yield the required fibrid; fiber ratio of 3:1. It will also be understood that the screen-and-block technique of Example 1 is again employed to prevent disturbing the first layer.

The two-layer vacuum-drained composite waterleaf is transferred to a drying oven. When dry, it is subjected to a pressure of 800 p.s.i. for 3 minutes while the platen contacting the first layer is at 180° C. and the other platen is at 50° C. The product has properties and utility similar to the product of Example 1. The "skin" side is smooth and glossy, whereas the "flesh" side is fibrous and dull.

*Example 3*

An artificial leather material is prepared by depositing in an 8″ x 8″ sheet mold a first layer consisting of 8 grams of a homogeneous blend of polyurea fibrids as described in Example 1 and vinyl fibrids produced as follows: 20 parts of a 5% solution of a 90:10 copolymer of vinyl chloride:vinyl acetate in methyl ethyl ketone is gradually poured into 80 parts of water at 60° F. while the water is vigorously agitated, followed by the usual screening, washing and dispersing of the fibrids in water. The fibrid blend of the first layer consists of 5.5 grams polyurea fibrids and 2.5 grams vinyl fibrids. A second layer consisting of 5 grams of Example 1 polyurea fibrids and 5 grams of ¼″ 1.5 d.p.f. nylon fiber is superposed over the first layer from a blended slurry.

When dry, the two-layer composite waterleaf is subjected to a pressure of 800 p.s.i. for 30 seconds while both platens are at 127° C. followed by an additional 30 seconds at 800 p.s.i. while the platen contacting the first layer (skin side) is at 160° C. and the other platen is at 55° C. The product is 22 mils thick, weighs 11.1 oz. per sq. yd., and has a tensile strength of 2.52 lbs./in./oz./sq. yd.[1]

*Example 4*

A four-layer composite waterleaf is prepared by first depositing in 2 separate 8″ x 8″ sheet molds a 2 gram layer of Example 1 polyurea fibrids and, atop this layer, a 6 gram layer of a 50:50 blend of Example 1 polyurea fibrids and ¼″ 1.5 d.p.f. nylon fibers. These two waterleaves, while wet, are combined under light pressure with the 6 gram layers contiguous with each other, and dried in a 100° C. oven. The resulting composite waterleaf is subjected to a pressure of 500 p.s.i. for 4 minutes while one platen is at 160° C. and the other platen is at 65° C. One side of the artificial leather product is a smooth and glossy layer of welded polyurea fibrids and the other side, resembling the flesh side of leather, is a layer of non-welded polyurea fibrids in substantially the same form as prior to pressing except for a slight increase in density.

*Example 5*

An artificial leather material similar to the product of Example 4 is produced from a three-layer waterleaf. A first layer consisting of 5 grams of Example 1 polyurea fibrids and 5 grams of ¼″ 1.5 d.p.f. nylon fibers is overlaid in the 8″ x 8″ sheet mold with a 5 gram layer of the same polyurea fibrids. The resulting two-layer waterleaf is turned over in the sheet mold and overlaid

---

[1] Measured by elongating a ½″ wide sample strip at a rate of 50% per minute at 2″ gauge length in an Instron Tester.

with a 5 gram layer of the same polyurea fibrids, so that both sides of the waterleaf consist 100% of polyurea fibrids. The composite three-layer waterleaf is dried and then subjected to a pressure of 800 p.s.i. for 4 minutes while one platen is at 163° C. and the other platen is at 45° C., thereby welding together the fibrids in the heated side.

*Example 6*

Two identical two-layer waterleaves are made by overlaying a 10 gram first layer in an 8" x 8" sheet mold with a 5 gram layer of Example 1 polyurea fibrids, the first layer consisting of 5 grams of the same polyurea fibrids and 5 grams of ¼" 1.5 d.p.f. nylon fibers. These two wet waterleaves are pressed together, with the first layer of one contiguous with the first layer of the other, to form a composite four-layer waterleaf. The compositie waterleaf is dried and then subjected to a presure of 1600 p.s.i. for 5.5 minutes while one platen is at 160° C. and the other platen is at 60° C. The product, a useful substitute for leather, has a "skin" side abrasion resistance similar to that of high grade horsehide, cowhide and kid. It is 40 mls. thick, weighs 21 oz. per sq. yd., has a tensile strength of 3.8 lbs./in./oz./sq. yd. Since the product is permeable to moisture, comfortable shoes and other apparel items can be made therefrom.

*Example 7*

This example illustrates the production of a leather-like sheet material from a single-layer homogeneous waterleaf consisting of fibrids of another polyurea elastomer.

A solution of polurea elastomer in N,N-dimethylformamide is prepared by a method similar to that described in Example 1 except the molecular weight of the poly(tetramethylene oxide) glycol is 700, and a brown pigment is admixed in a ball mill with the solution immediately prior to fibridation. Fibrids are then produced by the general method set forth in Example 1, i.e., by gradually pouring the solution into agitated glycerol. The fibrids are screened and washed in a sheet mold, redispersed in water, and deposited in a sheet mold to a dry waterleaf weight of 7.4 oz./sq. yd. and thickness of 32 mils.

A 4" x 4" piece of the waterleaf, after oven drying, is placed in a Carver laboratory press and subjected to a presure of about 800 p.s.i. for 30 seconds while one platen is at 200° C. and the other platen is at 100° C. The product which looks and feels like leather, has a thickness of 16 mils. Its resistance to edgewear abrasion is similar to that of good-grade shoe-upper leather. The "skin" side has a microporous structure, i.e., the pores are not readily apparent to the naked eye, thus permitting water vapor to pass through but not readily absorbing liquid water. The product has a leather permeability value, or "LPV" of 6500, as tested by the method described by Kanagy and Vickers in "Journal of American Leather Chemists Association" 45, 211–242 (April 19, 1950).

*Example 8*

This example illustrates the production of a leather-like sheet material from a single-layer waterleaf made from fibrids of still another polyurea elastomer.

Neopentyl glycol adipate having hydroxyl end groups and a molecular weight of 1000 is prepared in a known manner by esterifying neopentyl glycol with adipic acid. An isocyanate-terminated intermediate is made by dissolving 1 mole of the adipate ester and 2 moles of methylene bis(4-phenyl isocyanate) in toluene to form a 50% solution, and reacting on a steam bath. One mole of the intermediate and one mole of hydrazine hydrate, combined as a 10% solution in N,N-dimethylformamide, react to form a polyurea elastomer.

A quantity of polyurea fibrids is made by gradually pouring 75 parts of the elastomer solution into 400 parts of a 50/50 mixture of glycerine and water while the latter is agitated in a Waring Blendor with a variac setting of 80. 28 grams of fibrids prepared in this manner are screened and washed in a sheet mold, redispersed in water, and deposited in an 8" x 8" sheet mold equipped with a 100 mesh screen which is covered with a layer of nylon parachute fabric. The damp waterleaf in the sheet mold is covered with a piece of impervious plastic film, and vacuum drained for 5 minutes before it is removed, stripped from the nylon fabric, and dried in a 110° C. oven for one hour.

A 6" x 6" piece of the dried waterleaf is interposed between 2 pieces of aluminum foil and placed in a laboratory press where it is subjected to a pressure of 1000 p.s.i. for 30 seconds while one platen is at 150° C. and the other platen is at 100° C.

The resulting product, which looks, feels and performs much like leather, is useful for making shoe uppers. It has a thickness of 44 mils, a tensile strength of 400 p.s.i., a tensile modulus of 2000 p.s.i., a tongue tear strength of 0.11 lb./oz./yd.$^2$, a Schildknecht flex resistance of 3 million, and an LPV of 2200. Higher LPV's can be obtained by moderately reducing the pressing time.

*Example 9*

This example illustrates the manufacture of a leather-like shoe upper material from a two-layer waterleaf in which the top (skin side) layer consists of fibrids of a 70:30 blend of a particular type of polyurea elastomer and polyvinyl chloride, and the bottom (flesh side) layer consists of an 85:15 blend of fibrids of the same polyurea elastomer and nylon fibers.

Poly(tetramethylene oxide) glycol of 973 molecular weight in the amount of 1400 grams, is dissolved in 1825 ml. of toluene. By stripping this solution at atmospheric pressure, 200 ml. of distillate is removed. While the remaining solution is at 80° C., 720 grams of methylene bis(4-phenyl isocyanate) dissolved in 835 ml. of toluene is admixed therewith. The resulting mixture is stirred in a nitrogen atmosphere for 2 hours while heated at 80–90° C. to cap the glycol. Then 309.5 ml. of the capped intermediate product of this reaction (toluene solution) is admixed under nitrogen at room temperature with a blend of 1207 ml. of dry DMF and 108.2 ml. of a 0.938 molar solution of hydrazine hydrate in DMF. The last few ml. of the toluene solution is added dropwise. The solution of hydrazine-extended polyurea thus obtained, which has a viscosity of 35.75 poise (Brookfield), is cut with DMF to a 15.0 poise viscosity.

Fibrids are produced from this polyurea elastomer solution by gradually pouring 75 ml. of the solution into a one quart Waring Blendor containing an agitated mixture of 400 ml. of glycerine and 3 ml. of a non-ionic wetting agent ("Triton" X–100); the variac setting is at 80 volts. 106.2 grams of polyurea fibrids produced in this manner are deposited in a sheet mold, washed with water, and dispersed in water.

Fibrids consisting of a 70:30 blend of polyurea elastomer and polyvinyl chloride are prepared by first blending 3340 grams of the above-described 15.0 poise solution of polyurea elastomer with 1255 grams of a 10% solution of polyvinyl chloride ("Geon" 101) in DMF. Batchwise, 75 ml. of the blended solution are gradually poured into a one quart Waring Blendor containing 400 ml. of glycerine which is being agitated at a variac setting of 80. 62.5 grams of fibrids produced in this manner are deposited in a sheet mold, water-washed, and slurried in water containing a trace of "Triton" X–100.

A first waterleaf is made by depositing the 62.5 grams of polyurea: polyvinyl chloride fibrids in a 20" x 20" sheet mold equipped with a 100 mesh stainless steel screen covered with a layer of nylon parachute fabric. Then the damp waterleaf, supported by the nylon fabric, is removed from the sheet mold.

A second waterleaf is made by depositing in a 20" x 20" sheet mold, similarly equipped with a 100 mesh screen covered with nylon fabric, an 85:15% blend of polyurea elastomer fibrids and ¼" 3 d.p.f. nylon fibers. This waterleaf is deposited from a fibrid: fiber slurry prepared by thoroughly dispersing the required amount of the nylon fibers in water containing a trace of "Triton" X-100, followed by blending this dispersion with the above-prepared dispersion of 106.2 grams of polyurea fibrids. This second waterleaf, while still damp and supported by the nylon fabric, is removed from the sheet mold.

Next, the sheet mold is filled with water up to the level of the 100 mesh screen. The first waterleaf, still damp and supported by the nylon fabric, is placed in the sheet mold so that the nylon fabric is contiguous with the screen. Then the second waterleaf, likewise still damp and supported by nylon fabric, is superposed over the first waterleaf, the nylon fabric of the second waterleaf being on top. After the hopper of the sheet mold is clamped in place over the upper fabric, water is carefully introduced to a depth of about 2 inches above the assembled waterleaves, which are thus allowed to soak for about 5 minutes to enhance the mingling of the fibrids in the contacting surfaces of the two waterleaf layers. The water is then drawn off and the waterleaf structure is vacuum-drained for 5 minutes beneath an impervious sheet of polyethylene. The resulting composite waterleaf is removed from the sheet mold, stripped from the 2 pieces of nylon fabric, placed on a piece of glass cloth, and dried in a 120° C. oven for one hour.

The 20" x 20" two-layer waterleaf is compacted for dye coloring by a one minute pressing at 140 p.s.i. between platens heated to 125° C. It is then dyed a brown color by a known method in which it is immersed in a 0.5% hot alcohol solution of commercial dyes (e.g., a blend of "Luxol" fast black, red, and orange) and thereafter dried.

Finally, the dyed composite waterleaf is converted to a useful shoe upper material by subjecting it to a pressure of 120 p.s.i. for 10 seconds while the platen adjacent the first layer (polyurea:vinyl fibrids) is at 200° C. and the other platen is at room temperature, followed by cooling under the same pressure. During the pressing, the "skin" side is embossed in a leather-like grain by means of a "Scotch grain" embossing plate attached to the heated platen. The structure of the product is illustrated in the attached drawing.

The product of this example has a thickness of 55 mils, an LPV of 3060, a Schildknecht flex resistance of 10 million cycles, and an edgewear abrasion resistance of 750 cycles (using dry #10 duck to apparent roughening). Shoes having uppers made of the product of this example were found to be comfortable, durable and of neat appearance.

*Example 10*

A leather replacement material for shoe uppers and the like is produced from a two-layer waterleaf in which the top layer consists of pigmented fibrids of a 70:30 blend of polyurea elastomer and polyvinyl chloride, and the bottom layer consists of a 5:95 blend of nylon fibers and pigmented fibrids of a composite polyurea elastomer to which has been added an antioxidant.

The fibrids for the top layer of the waterleaf are made in the same manner as those of the top layer of Example 9, except that a brown pigment is uniformly dispersed in the blended polyurea:vinyl solution prior to fibrid formation in the amount of 5% pigment by weight of polymer solids. The pigment, consisting of a 15:1 blend of ferric oxide brown and carbon black, is blended with the polymer solution by any convenient method, e.g., by the sand-grinding method described in U.S. Patent 2,581,414.

The fibrids for the bottom layer of the waterleaf are made by first preparing a composite polyurea elastomer as follows: By the general method for making the polyurea elastomer described in Example 9, polyoxyethylene glycol of 1003 molecular weight and poly(tetramethylene oxide) glycol of 973 molecular weight are each individually capped by reacting them with methylene bis(4-phenyl isocyanate). The solutions of the two capped intermediates are then blended to yield a 50:50 solids ratio of the intermediates in the blended solution. The combined intermediates are extended by reacting them with hydrazine hydrate in accordance with the description in Example 9. A brown pigment is uniformly dispersed in the solution of composite polyurea elastomer thus obtained, employing the same dispersion method, pigment, and ratio of pigment to polymer as used above in the first layer. A commercial antioxidant (e.g., American Cyanamid antioxidant No. 2246) is also admixed with the polyurea solution in the amount of 1% by weight of the polyoxyethylene glycol used in forming the polymer. The antioxidant enhances the flex life of the final product by preventing polymer degration. Fibrids of the composite polyurea are formed by gradually pouring 50 ml. of the resulting solution into 400 ml. of a 50:50 blend of glycerine and water at 41° C. while the latter is agitated in an Osterizer set to operate at 120 volts. After washing and slurrying the fibrids in water, sufficient ¼" 3 d.p.f. nylon fibers are blended therewith to give a fiber:fibrid ratio of 5:95.

10 grams of the top layer fibrids are deposited on a nylon fabric-covered screen in 8" x 8" sheet mold. This layer is overlaid with 17 grams of the blend of bottom layer fibrids and nylon fibers, using the wood block technique or equivalent means to prevent disturbing the first layer. The two-layer waterleaf is given a final 5 minute vacuum draining beneath a sheet of polyethylene, after which the nylon fabric is removed and the waterleaf is dried in an oven.

The dried composite waterleaf is converted to a leather-like sheet by placing it in a press equipped with a graining plate and subjecting it to a pressure of 60 p.s.i. for 10 seconds while the platen adjacent the top layer (polyurea: vinyl fibrids) is at 200° C. and the other platen is at 120° C.

The product has a thickness of 42 mils, and sufficient durability and permeability for many leather replacement uses. Its edge wear resistance is considerably superior to that of Kipp leather when abraded with emery to noticeable roughness.

*Example 11*

Example 10 is repeated except the fibrids are deposited on a woven cotton fabric supported by the screen in the sheet mold, and the fabric is left attached to the composite waterleaf to become an integral part of the final product. The fabric is an open weave cotton sheeting weighing 3.8 ounces per square yard and having a thread count of 56 x 60. The fabric is adjacent the cooler platen during conversion of the composite fibrous sheet (waterleaf:fabric) to a leather-like sheet having excellent tear-resistance. The product is especially useful as a material for shoe uppers, upholstery, and the like.

Useful modifications of the soft polymer fibrids can be achieved by incorporating hard polymers and other additives in the polymer solution prior to forming the fibrids. This is illustrated in Examples 9 and 10 wherein the additives are polyvinyl chloride, pigment and antioxidant. Another very useful additive is corn zein. For example, when a solution containing a 20:80 blend of zein and a polyurea elastomer as employed in Example 9 is converted into composite fibrids, and a dry waterleaf thereof is pressed in accordance with the method of this invention, a leather substitute is produced which has a surprisingly leather-like feel. Other well known additives can also be blended with the fibrid-forming polymer solution, such as curing agents, plasticizers and release agents. Additives can also be incorporated into the fibrid slurry from which the waterleaf is formed.

When producing flexible sheet materials, the waterleaf should ordinarily contain over 50%, based on the fibrids therein, of soft polymer fibrids. Fibrids of polyurea elastomers (i.e., elastomeric polymers made by extension of a diisocyanate with a diamine) are especially preferred in making leather replacement products. For shoe upper materials, the types of polyurea elastomer fibrids illustrated in Examples 7 through 10, as well as the above-mentioned zein modification, are particularly preferred to achieve a less "rubbery" and more "leathery" feel or texture.

Fibrids made from heat-curable elastomers are conveniently used in making elastomeric products such as tank linings. If the uncured elastomer is tacky at room temperature, fibridation (fibrid formation) is made possible by chilling the solution and precipitant below the temperature at which the elastomer becomes tacky.

The manufacture of rigid or semi-rigid sheet materials is also within the scope of the present invention, wherein at least 50% by weight of the waterleaf fibrids are composed of a hard polymer.

The fibrids in the waterleaf layer which will become the hot-pressed side of the product can be made of any fibrid-forming normally solid synthetic polymer which, at least initially, is capable of welding to itself when subjected to heat and pressure.

The fibrid-containing waterleaf can be a single-layer or multi-layer structure of any desired thickness. Up to about 95% by weight of any given layer can be fibers, however in most cases more than 50% by weight of fibers will not be preferred. In many products, e.g. leather replacement materials, it is usually preferable to have the layer to become the "skin" side consist of about 95 to 100% of fibrids, because of the objectionable surface fuzziness obtained when substantial amounts of fibers are present. In other waterleaf layers of such products, however, substantial proportions of fibers are often preferred, since they tend to enhance tear resistance and other properties.

Any one or more of a wide variety of synthetic or natural staple fibers can be included in the waterleaf; among the more desirable ones are nylon, rayon, polyacrylonitrile, and polyester, especially spontaneously elongatable polyethylene terephthalate fibers (described in Belgian Patent No. 566,145). Fiber length is preferably between about ⅛ inch and 2 inches, but fibers of 0.05 to 3 inches can also be used. The fibers can be monofilaments, multifilaments or spun yarns; and they can be twisted, dyed, drawn, undrawn, pigmented, or plasticized. The fibers are slurried with the fibrids before the waterleaf is formed.

When the waterleaf is a composite of two or more layers, one layer can contain a majority of soft polymer fibrids and another layer can contain a majority of hard polymer fibrids. For best interlayer bonding, however, adjacent layers should contain an appreciable proportion of fibrids of chemically similar polymers. Layered fibrid-containing waterleaf structures are disclosed and claimed in abandoned U.S. application S.N. 786,956, filed January 15, 1959, in the name of E. G. Campbell and assigned to the assignee of the present application. The structures and methods of making them as taught therein are useful in making the structures to be pressed in accordance with the present invention.

One or more fibrous non-fibrid-containing layers can also be included in the structure to be pressed, as taught in the patent application just referred to, whereby adjacent layers are integrally bound together with fibrids. The non-fibrid layer can be, for example, a woven fabric, a non-woven fabric, or a fibrous waterleaf.

Having selected the desired fibrids, and in certain cases fibers, and having made a waterleaf thereof, and dried the waterleaf, the waterleaf (including fibrid-free layers when such are present) is pressed while only one side thereof is hot enough to enable the fibrids therein to become welded together, said side becoming the relatively smooth and dense ("skin") side of the product. The heating of the one side can be done either prior to or during the pressing, employing any known heating method that is convenient. Continuous pressing can be accomplished by passing the waterleaf, with one side preheated, between calender rolls, or by passing the waterleaf through apparatus of the type having a heated polished steel pressure band passing about a cooled steel drum. Embossing of the hot-pressed side can be done either during or after the hot-pressing step, when a grained or other embossed surface is desired.

The best temperature and/or pressure to be employed in any case will be governed by such variables as waterleaf thickness, fibrid welding temperature, press dwell time, and required product properties. Those skilled in the art of pressing and laminating polymeric sheets will be able readily to adapt pressing conditions to the situation at hand, in the light of the teaching herein. For example, it will be apparent that less heat, pressure and/or time is needed to convert a given waterleaf to a product such as a leather substitute having a moisture-permeable top surface than is needed when making a product such as floor tile having an impervious surface. In other words, the optimum degree of fibrid welding varies according to the intended product.

The method of the present invention has the advantage of being adapted for economical mass production techniques. For example, the waterleaf can be formed continuously on a Fourdrinier machine, continuously dried in a heat zone, preheated on one side, and passed between a hot calender roll and a cold calender roll. The method is also adaptable to small-scale special runs on commonly used equipment, such as sheet molds and laboratory presses. Products are obtainable by this method which have heretofore either been impossible to make, or have been impractical or uneconomical to make.

A wide variety of useful and novel products are obtainable in accordance with the teaching hereinabove, in the form of, for example, leather-like materials for shoes, gloves, coats, handbags, luggage, and upholstery, as well as floor coverings, wall tile, tank linings, book covers, and paneling. From the foregoing, it will be seen that a considerable advance has been provided in the art of making polymeric sheets having one side substantially more smooth and dense than the other side.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:
1. A leather-like, flexible, moisture-permeable polymeric sheet material comprising
   (a) a layer which contains fibrids in intimately interlaced matted form, said layer having a fibrid content of 50–100 weight percent and a complementary non-adhesive staple fiber content of up to about 50 weight percent;
   (b) an exposed surface of said layer being microporous and relatively smooth and dense, the fibrids therein being integrally joined to one another, and at least 51 weight percent of the fibrids therein being composed of a polymer having an initial modulus below 0.9 gram per denier;
   (c) the other surface of said layer being substantially less smooth and dense than said exposed surface, and the fibrids therein being substantially discrete.

2. A product as defined in claim 1 wherein said layer has a fibrid content of 95–100 weight percent.

3. A product as defined in claim 1 wherein said exposed surface consists essentially of fibrids of a polyurea elastomer.

4. A product as defined in claim 1 wherein said exposed surface consists essentially of fibrids of a polyvinyl chloride:polyurea elastomer blend.

5. A product as defined in claim 1 wherein said other surface consists essentially of a mixture of polyurea elastomer fibrids and staple fibers.

6. A product as defined in claim 1 wherein said sheet material comprises a fabric in integral relationship with said other surface of the waterleaf.

7. A leather-like, flexible, moisture-permeable polymeric sheet material consisting essentially of fibrids in intimately interlaced matted form, an exposed surface of the sheet material being microporous, relatively smooth and dense, the fibrids therein being integrally joined to one another, and a major proportion of the fibrids therein being fibrids of a soft polymer; the other surface of the sheet material being substantially less smooth and dense than said exposed surface and the fibrids therein being in a discrete condition.

8. A method of making a leather-like, flexible, moisture-permeable sheet material which comprises pressing a waterleaf containing fibrids while an exposed surface of the waterleaf is at an elevated temperature whereby said exposed surface becomes relatively smooth and dense and the fibrids therein become welded to one another to form a microporous structure, the other surface of the waterleaf being kept cool enough during said pressing to prevent the fibrids therein from becoming welded to one another, and thereafter cooling said exposed surface; a major proportion of the fibrids in said exposed surface being composed of a soft polymer; said waterleaf having a fibrid content of 50–100 weight percent and a complementary non-adhesive staple fiber content of up to about 50 weight percent.

9. A method as defined in claim 8 wherein said waterleaf consists of a single homogeneous layer.

10. A method as defined in claim 8 wherein said waterleaf consists of a plurality of fibrid-containing layers of different composition.

References Cited in the file of this patent

UNITED STATES PATENTS

| | | |
|---|---|---|
| 2,253,000 | Francis | Aug. 19, 1941 |
| 2,357,392 | Francis | Sept. 5, 1944 |
| 2,438,156 | Dodge | Mar. 23, 1948 |
| 2,476,283 | Castellan | July 19, 1949 |
| 2,497,117 | Dreyfus | Feb. 14, 1950 |
| 2,689,199 | Pesce | Sept. 14, 1954 |
| 2,813,776 | Koller | Nov. 19, 1957 |
| 2,891,279 | Neumann | June 23, 1959 |

FOREIGN PATENTS

| | | |
|---|---|---|
| 120,376 | Australia | Sept. 14, 1945 |
| 578,156 | Great Britain | June 18, 1946 |